(12) United States Patent
Tamian

(10) Patent No.: US 6,601,601 B2
(45) Date of Patent: Aug. 5, 2003

(54) ADJUSTABLE VIBRATION VALVE

(76) Inventor: Richard Tamian, 69 Edison Ter., Sparta, NJ (US) 07871

( * ) Notice: Subject to any disclaimer, the term of this patent is extended or adjusted under 35 U.S.C. 154(b) by 86 days.

(21) Appl. No.: 10/028,469

(22) Filed: Dec. 19, 2001

(65) Prior Publication Data

US 2003/0111109 A1 Jun. 19, 2003

(51) Int. Cl.$^7$ ............................................... F16K 17/36
(52) U.S. Cl. ........................................ 137/38; 251/212
(58) Field of Search .............................. 137/38, 39, 43; 251/212

(56) References Cited

U.S. PATENT DOCUMENTS 4,378,815 A * 4/1983 Mochida et al. ............... 137/43
4,991,615 A * 2/1991 Szlaga et al. .................. 137/43
5,666,989 A * 9/1997 Roetker ......................... 137/43

* cited by examiner

Primary Examiner—Stephen M. Hepperle

(57) ABSTRACT

The adjustable vibration valve of the invention is a simple but effective device to regulate the flow of a fluid when the invention is vibrated by an outside source, where the adjustable vibration valve comprises a flow chamber with an inlet port and an outlet port, an adjustable valve seat between the lower interior volume of the flow chamber and the outlet port, and a selectively sized control ball which remains on the adjustable valve seat in moveable engagement with the adjustable valve seat, such that said control ball is stable relative to said adjustable valve seat when the adjustable vibration valve is at rest, forming a seal, but which becomes disengaged from the adjustable valve seat when the vibration valve device is vibrated by an outside source, permitting fluid present in the flow chamber to flow past the selectively sized control ball, through the adjusted inner opening of the adjustable valve seat, and then through the outlet port.

8 Claims, 4 Drawing Sheets

ADJUSTABLE VIBRATION VALVE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF INVENTION

This invention relates generally to a device that regulates the flow of a fluid to periods during which the device is vibrated by an outside influence. The invention is based on the realization that the vibration present in many mechanical devices can control a vibration valve when the mechanical device is operating, such that fluid can flow and be adjusted when the device is operating and can be automatically restricted when the mechanical device is not operating. All former inventions, such as U.S. Pat. No. 1,423,831 to Cochrane (1922), U.S. Pat. No. 3,661,167 to Hussey (1972), U.S. Pat. No. 3,738,608 to Nutten et al. reissued (1983), and U.S. Pat. No. 4,590,896 to Wissmann et al. (1986) that make use of a type of vibration valve in their patent device, do not have the ability to regulate the amount of fluid flowing from the vibration valve's Inlet ports to their outlet ports.

My adjustable vibration valve is a stand alone self contained unit which, unlike the vibration valves incorporated in other said patents, can easily be installed into any fluid flow line on any vibrating device. With my adjustable valve seat, my invention can truly regulate and control the amount of fluid flowing from the inlet port of the vibration valve to its outlet port. Also with the ability to exchange control balls with varying diameters into the flow chamber upon demand, my device becomes much more versatile in controlling said fluid flowing through the system.

BRIEF SUMMARY OF THE INVENTION

The adjustable vibration valve of the invention is a simple but effective device to regulate and control the flow of a fluid when the valve is vibrated by an outside source, and automatically stops the flow of the fluid when the mechanical outside device is turned off, thus not requiring the generation of any other control signals or the intervention of a human operator.

The adjustable vibration valve according to the invention comprises an inlet port connected to a flow chamber that is connected to an outlet port. An adjustable valve seat is located between the flow chamber and said outlet port, and has the advantage to adjust the amount of fluid flowing between the flow chamber and the outlet port.

The invention relies on vibrations to accelerate a selectively sized control ball which cooperates with said adjustable valve seat such that the acceleration of the control ball causes it to move out of engagement with said adjustable valve seat allowing fluid to flow from the flow chamber, around the control ball, through the adjusted opening of the adjustable valve seat, and then through the outlet port. When no vibration is present, the control ball is stable against the adjustable valve seat forming a seal at the contact between the control ball and said adjustable valve seat, thus preventing any fluid flow from the flow chamber to the outlet port. Selecting the size of the control ball will also allow for fluid flow regulation, such that the larger the diameter of the control ball, the less fluid can pass around it, while the smaller sized control ball permits more fluid to flow past it to the outlet port.

My stand alone invention only requires the vibrations from an outside source with no other outside influences, to both regulate and prevent the flow of fluid in any fluid flow line on any vibrating device. Other advantages and essential details of the invention will become apparent from the subsequent description of preferred embodiments, the drawings, and the claims.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
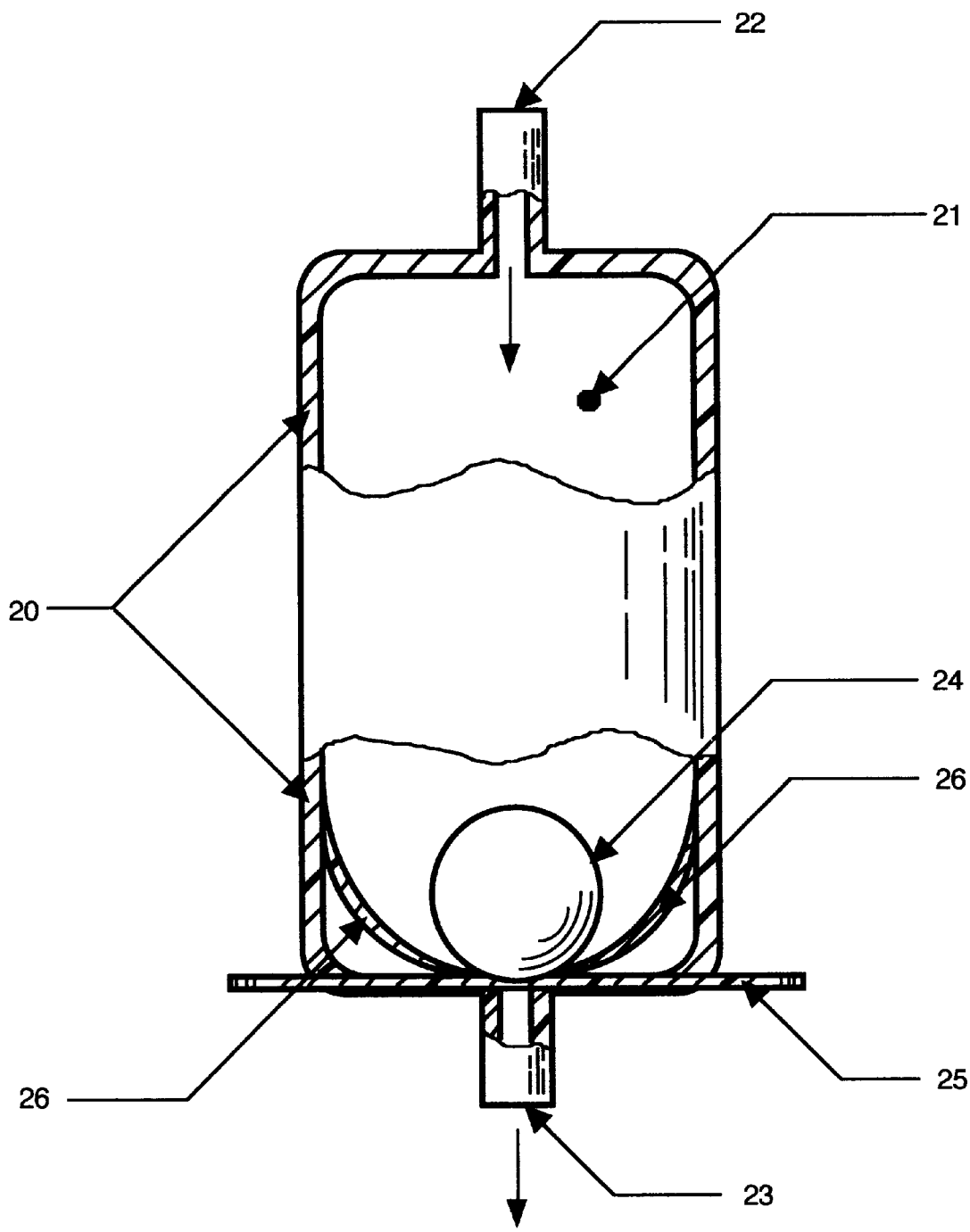
FIG. 1 is a simplified view of an adjustable vibration valve according to the invention, shown in partial section.

Referring particularly to FIG. 1, the adjustable vibration valve according to the illustrated embodiment comprises a shell casing 20 and a flow chamber 21 in which a selectively sized control ball 24 is contained. The adjustable vibration valve has an inlet port 22 and an outlet port 23. The interior diameter of the flow chamber 21 must exceed the diameter of the control ball 24, which is spherical in shape, to allow fluid to flow past the control ball to the outlet port 23 when control ball 24 is upset from the adjustable valve seat as will be described below. Between the flow chamber 21 and the outlet port 23 an adjustable valve seat 25 is placed at the junction between the lower section of the flow chamber 21 and the outlet port 23. The adjustable valve seat 25 is formed so that control ball 24 is in moveable engagement with the adjustable valve seat 25 when the device is at rest. The diameter of the selected control ball 24 must be greater than the largest diameter opening of the adjustable valve seat 25. When the control ball is at rest on the adjustable valve seat 25, a seal is formed preventing any fluid to flow into outlet port 23 from flow chamber 21. The bottom of the flow chamber 26 is formed such that it allows for the control ball to regain its static position at rest on the adjustable valve seat after the vibrations from the outside source have ceased.

Preferably, the control ball 24 is made of stainless steel, to provide resistance to corrosion. Optionally, the control ball 24 may be coated with a polytetrafluoroethylene (PTFE) material such as TEFLONE®, which can provide a tighter seal between control ball 24 and adjustable valve seat 25. The adjustable valve seat 25 can be made of any type of material that would ensure a tight seal between it and the control ball 24. As those in the art will appreciate, the mass and the buoyancy of the ball 24 in the fluid must be chosen with an eye toward the particular fluid being controlled. If the ball is too buoyant, it will not sink properly in the fluid, and will not create a good seal. Conversely, if the ball is not buoyant enough or is too heavy, it will not be effectively moved under vibration, and will not permit proper fluid flow.

Acceleration of the adjustable vibration valve, such as by engine vibration, causes the control ball 24, which is initially at rest on the adjustable valve seat 25, to disengage from the adjustable valve seat 25, due to the control ball's inertia, thus permitting fluid to flow from the flow chamber 21 past the control ball 24 through the adjustable valve seat 25 then through the outlet port 23.

The adjustable vibration valve must be oriented substantially vertical. The limiting deviation from vertical is determined by the position wherein the control ball 24 no longer remains engaged to the adjustable valve seat 25 when the adjustable vibration valve is at rest. The adjustable valve seat 25 must be formed within necessary tolerances to allow the control ball 24 to seal with the adjustable valve seat 25 when the vibration valve device is at rest.

Figure 2:
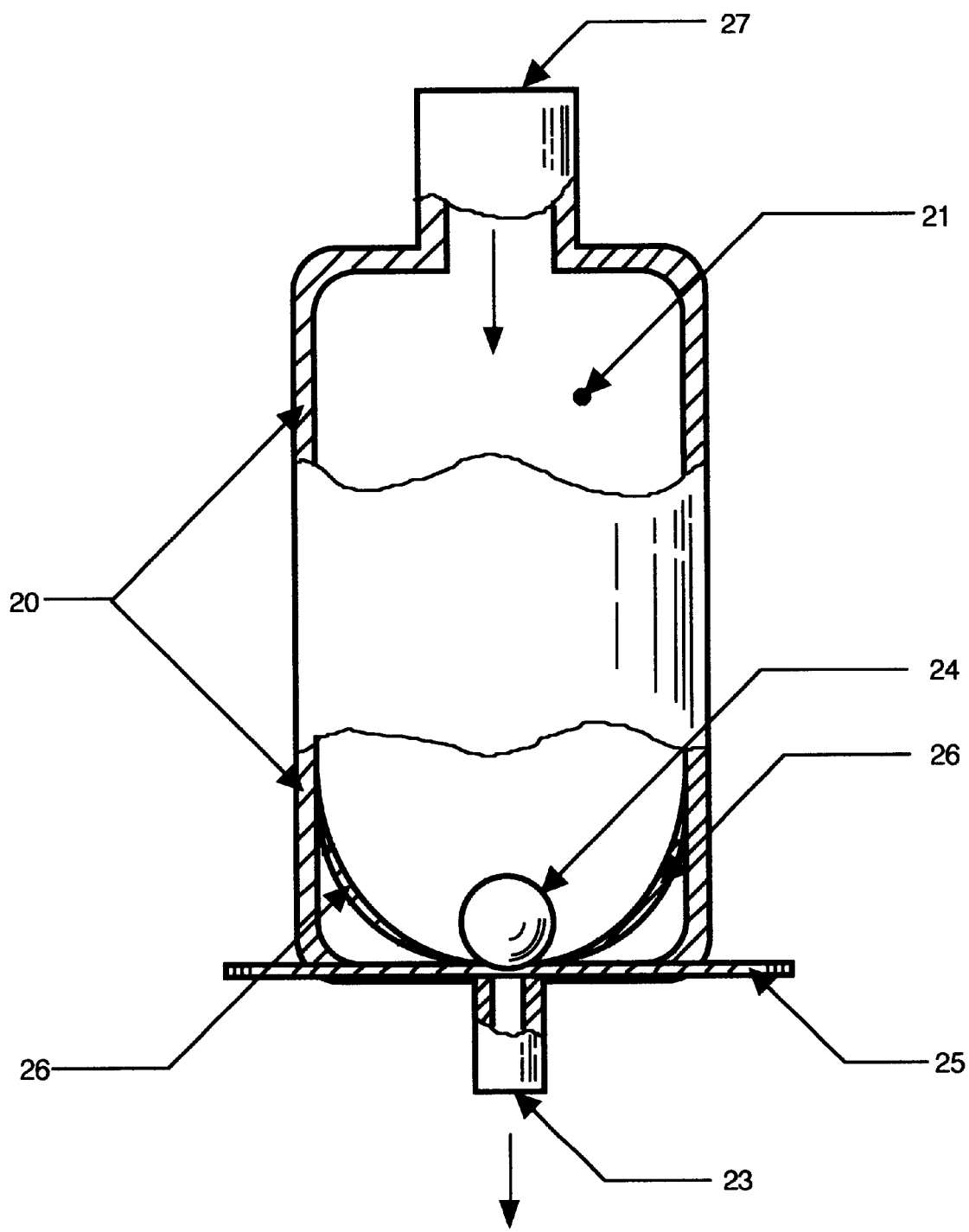
FIG. 2 is a simplified view, in partial section, of an adjustable vibration valve according to the invention wherein the inlet port is sized to allow for the insertion and extraction of selectively sized control balls.

FIG. 2 shows an alternative embodiment of the adjustable vibration valve, showing a flow chamber 21, outlet port 23, and adjustable valve seat 25, as with the embodiment of FIG. 1. However, in this embodiment, the inlet port 27 has an interior diameter larger than the outer diameter of the control ball 24. This permits the exchange of selectively sized control balls to be inserted into the flow chamber 21 after the flow chamber 21 portion has been fabricated. This embodiment of the adjustable vibration valve provides for greatly simplified assembly. Differently sized control balls can be selectively chosen to control the amount of fluid flowing through the vibration valve. A smaller control ball will allow for more fluid to flow past it through the adjustable valve seat 25 to the outlet port 23, while a larger control ball will restrict the fluid flow.

Figure 3:
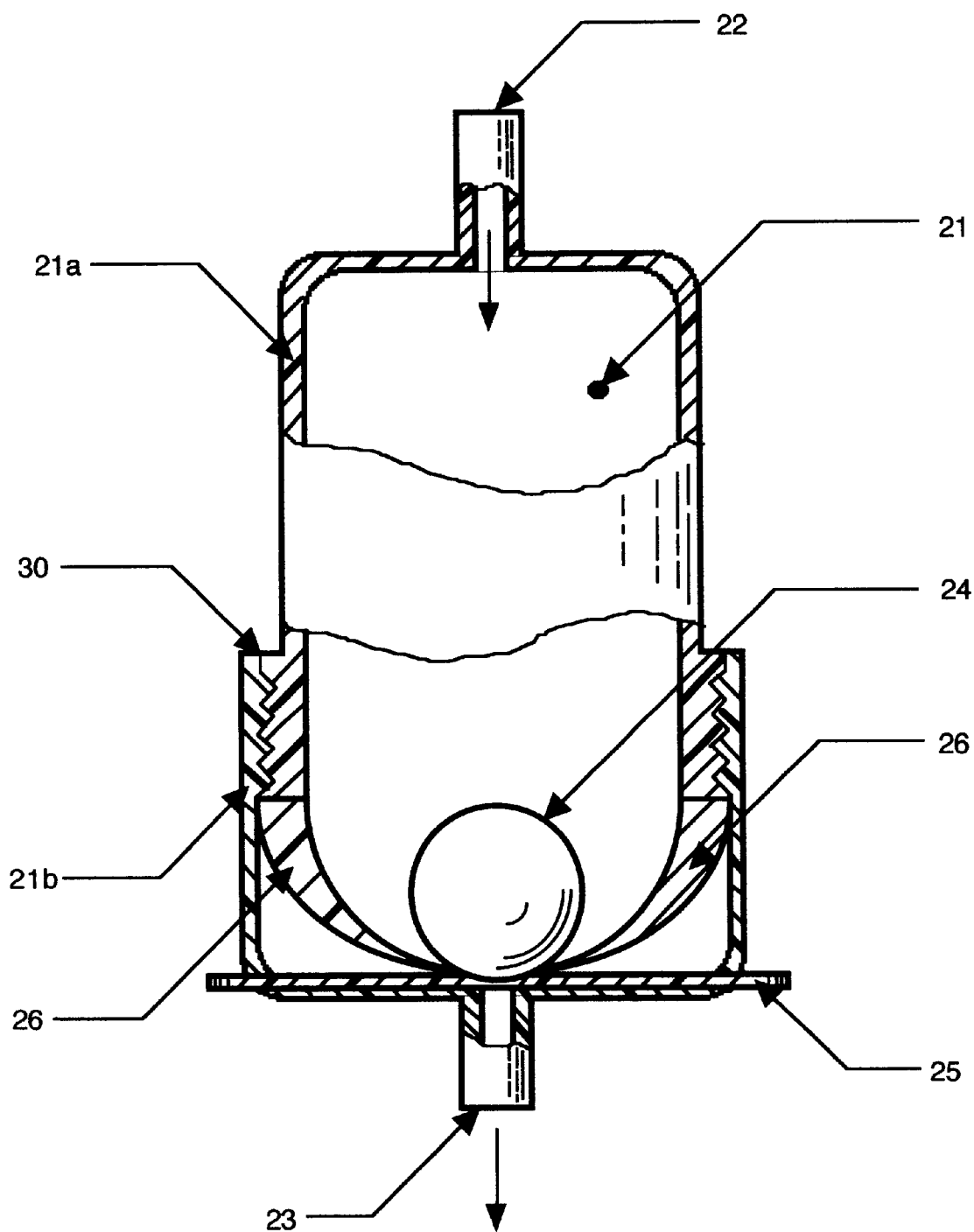
FIG. 3 is a simplified view, in partial section, of an adjustable vibration valve showing a two piece flow chamber, wherein the two pieces are connected by interlocking attachment means such as screw threads, slideable engagement, and friction fit to allow separation of the two halves for the insertion and extraction of selectively sized control balls.

FIG. 3 illustrates an embodiment of the adjustable vibration valve wherein the flow chamber 21 is made of two pieces 21a and 21b fabricated separately, then joined together through an interlocking connection means 30, such as a threaded connection, or alternatively by twist lug or by bayonet type connection or by friction fit. By separating the two sections of the flow chamber 21a from 21b, a selectively sized control ball 24 can be replaced or exchanged into the flow chamber.

Figure 4:
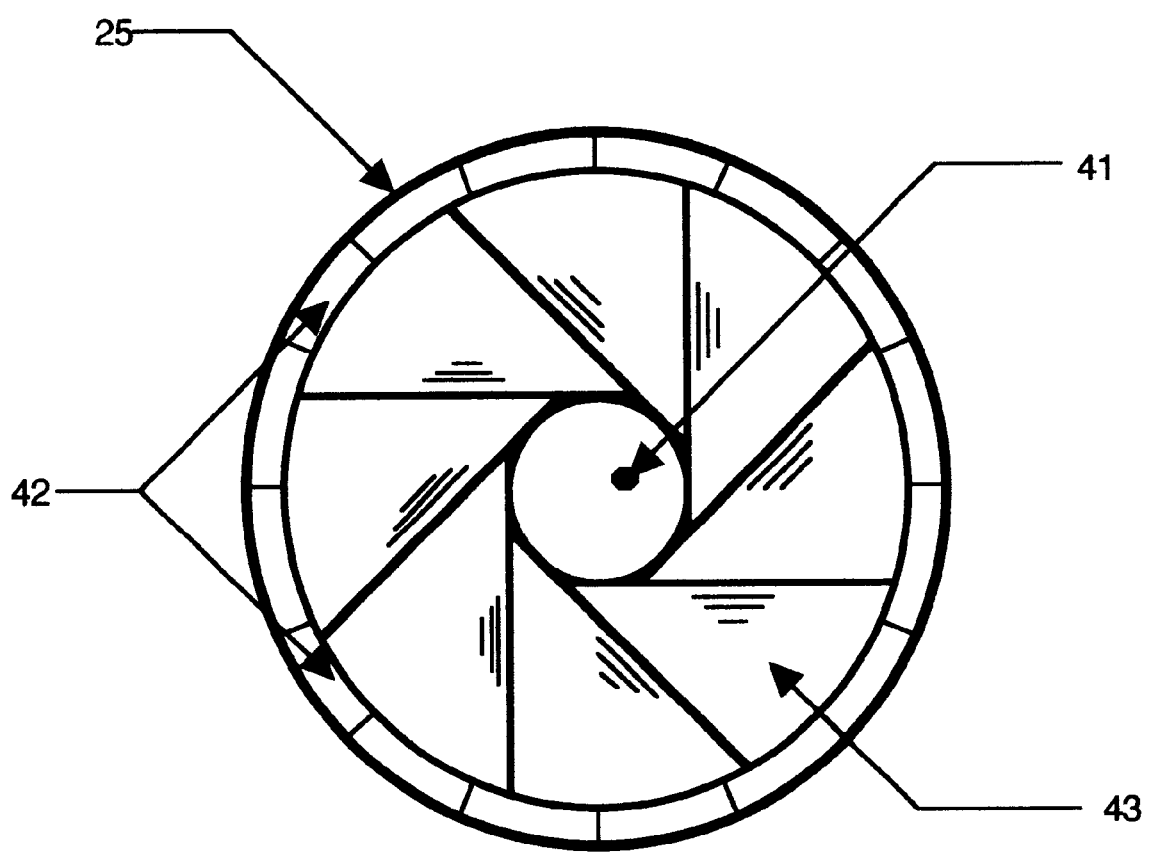
FIG. 4 is a simplified top view of the adjustable valve seat of the adjustable vibration valve showing it as a washer type device such that its movable outer diameter ring adjusts its inside diameter opening similar in design to that of a camera iris type diaphragm.

FIG. 4 illustrates the adjustable valve seat 25, that is a washer type device, positioned at the bottom of flow chamber 21 and covers the outlet port 23. The inside hole diameter 41 of said adjustable valve seat 25 is adjusted by the outer ring 42, similar in design to that of a camera iris type diaphragm 43. The adjusted inside diameter 41 determines the amount of fluid flowing from the flow chamber 21 to the outlet port 23. The largest diameter of the inside opening 41 of the adjustable valve seat 25 should not exceed the diameter of the outlet port 23, and should be small enough to allow the control ball 24 to disengage effectively when sufficient vibrations are present. The amount of fluid flowing through the adjustable valve seat 25 will be greatest when the adjustable valve seat 25 is set to its largest opening, and conversely, the fluid flow will be least when the adjustable valve seat opening is set to its smallest opening. The inside opening 41 of said adjustable valve seat 25 may be closed completely if desired, thus preventing any fluid to flow to the outlet port 23 even if the vibration valve is still vibrating. The adjustable valve seat opening 41 is operated manually.

From the foregoing description it has been apparent that the invention described herein, being subjected to the vibrations from an outside source, provides a simple yet highly practical device for regulating, adjusting and preventing the flow of a fluid. All prior art patents that include a vibration valve device do not make use of an adjustable valve seat; nor do they have the capability of exchanging or replacing selectively sized control balls; nor are they self contained, stand alone units. Since my invention has all of these advantages incorporated in it, a truly versatile and integrated fluid controlling system is formed that can easily be installed into any fluid flow line on any vibrating device, and thereby regulating said fluid flow in the line of said device.

What I claim as my invention is:

1. A fluid flow control device comprising a flow chamber with an inlet port and an outlet port, an adjustable valve seat between the interior volume of the flow chamber and the outlet port, and a selectively sized control ball in moveable engagement with said adjustable valve seat, such that said control ball is stable relative to the adjustable valve seat when the valve device is at rest, and upset from the adjustable valve seat when the vibration valve device is moved by oscillations and vibrations, allowing fluid present in the flow chamber to flow past the control ball, through the adjustable valve seat, and then through the outlet port.

2. A fluid flow control device as described in claim 1, wherein the inlet port is larger in diameter than the selectively sized control balls being used.

3. A fluid flow control device as described in claim 1, wherein the flow chamber comprises at least two separate portions.

4. A fluid flow control device as described in claim 3, wherein said portions are connectable to each other by interlocking connection means.

5. A fluid flow control device as described in claim 3, wherein said portions are connectable to each other by slideable connection means.

6. A fluid flow control device as described in claim 1, wherein said adjustable valve seat is formed between the flow chamber and the outlet port.

7. A fluid flow control device as described in claim 6, wherein said adjustable valve seat is of washer type design, said adjustable valve seat having a movable outer ring that adjusts an inner diameter opening, wherein said inner diameter opening is determined by a camera iris diaphragm type design.

8. A stand alone, fluid flow control device comprising a flow chamber formed from a first portion comprising part of the flow chamber and an inlet port and a second portion comprising the remainder of the flow chamber and an outlet port, said portions being joinable to each other to define an interior volume; an adjustable valve seat, adjusting the amount of fluid flowing between the interior volume of the lower part of the flow chamber and the outlet port; and a selectively sized control ball which is moveably engaged with the adjustable valve seat, such that said control ball is stable relative to the valve seat when the fluid flow control device is not exposed to vibrations, and upset from the adjustable valve seat when the fluid flow control device is accelerated by oscillations and vibrations, allowing fluid present in the flow chamber to flow past the control ball through the adjustable valve seat and then through the outlet port.

* * * * *